United States Patent
Cosatto

(10) Patent No.: US 10,336,252 B2
(45) Date of Patent: *Jul. 2, 2019

(54) LONG TERM DRIVING DANGER PREDICTION SYSTEM

(71) Applicant: NEC Laboratories America, Inc., Princeton, NJ (US)

(72) Inventor: Eric Cosatto, Red Bank, NJ (US)

(73) Assignee: NEC Corporation, Tokyo (JP)

( * ) Notice: Subject to any disclaimer, the term of this patent is extended or adjusted under 35 U.S.C. 154(b) by 356 days.

This patent is subject to a terminal disclaimer.

(21) Appl. No.: 15/400,059

(22) Filed: Jan. 6, 2017

(65) Prior Publication Data

US 2017/0158129 A1 Jun. 8, 2017

Related U.S. Application Data

(62) Division of application No. 15/088,494, filed on Apr. 1, 2016, now Pat. No. 9,592,828.

(Continued)

(51) Int. Cl.
*B60Q 9/00* (2006.01)
*B60W 30/095* (2012.01)
(Continued)

(52) U.S. Cl.
CPC .............. *B60Q 9/008* (2013.01); *B60Q 5/006* (2013.01); *B60Q 9/00* (2013.01); *B60W 10/04* (2013.01);
(Continued)

(58) Field of Classification Search
CPC .......... B60Q 9/008; B60Q 9/00; B60Q 5/006; B60W 10/04; B60W 10/18; B60W 10/30; B60W 30/0953; B60W 30/0956; B60W 40/04; B60W 40/09; B60W 40/06; B60W 50/14; B60W 50/16; B60W 2040/0827;
(Continued)

(56) References Cited

U.S. PATENT DOCUMENTS 6,226,389 B1 * 5/2001 Lemelson .............. G01S 13/931
382/104
6,906,639 B2 * 6/2005 Lemelson .............. G01S 13/931
180/167

(Continued)

*Primary Examiner* — Anne M Antonucci
*Assistant Examiner* — James E Stroud
(74) *Attorney, Agent, or Firm* — Joseph Kolodka

(57) ABSTRACT

Systems and methods are disclosed to assist a driver with a dangerous condition by creating a graph representation where traffic participants and static elements are the vertices and the edges are relations between pairs of vertices; adding attributes to the vertices and edges of the graph based on information obtained on the driving vehicle, the traffic participants and additional information; creating a codebook of dangerous driving situations, each represented as graphs; performing subgraph matching between the graphs in the codebook and the graph representing a current driving situation to select a set of matching graphs from the codebook; determining a distance metric between each selected codebook graphs and the matching subgraph of the current driving situation; from codebook graphs with a low distance, determining potential dangers; and generating an alert if one or more of the codebook dangers are imminent.

20 Claims, 3 Drawing Sheets

Related U.S. Application Data

(60) Provisional application No. 62/146,565, filed on Apr. 13, 2015.

(51) Int. Cl.
| | | |
|---|---|---|
| *B60W 10/18* | (2012.01) | |
| *B60W 10/04* | (2006.01) | |
| *B60W 10/30* | (2006.01) | |
| *B60W 40/09* | (2012.01) | |
| *B60W 50/14* | (2012.01) | |
| *B60W 40/04* | (2006.01) | |
| *B60Q 5/00* | (2006.01) | |
| *B60W 40/08* | (2012.01) | |
| *B60W 40/06* | (2012.01) | |
| *B60W 50/16* | (2012.01) | |

(52) U.S. Cl.
CPC ............ *B60W 10/18* (2013.01); *B60W 10/30* (2013.01); *B60W 30/0953* (2013.01); *B60W 30/0956* (2013.01); *B60W 40/04* (2013.01); *B60W 40/09* (2013.01); *B60W 50/14* (2013.01); *B60W 40/06* (2013.01); *B60W 50/16* (2013.01); *B60W 2040/0827* (2013.01); *B60W 2050/143* (2013.01); *B60W 2050/146* (2013.01); *B60W 2420/42* (2013.01); *B60W 2420/52* (2013.01); *B60W 2540/22* (2013.01); *B60W 2540/26* (2013.01); *B60W 2540/30* (2013.01); *B60W 2550/12* (2013.01); *B60W 2550/20* (2013.01); *B60W 2550/402* (2013.01); *B60W 2710/18* (2013.01); *B60W 2710/30* (2013.01); *B60W 2720/106* (2013.01)

(58) Field of Classification Search
CPC ..... B60W 2050/143; B60W 2050/146; B60W 2420/42; B60W 2420/52; B60W 2540/22; B60W 2540/26; B60W 2540/30; B60W 2550/12; B60W 2550/20; B60W 2550/402; B60W 2710/18; B60W 2710/30; B60W 2720/106
USPC .......................................................... 701/70
See application file for complete search history.

(56) References Cited

U.S. PATENT DOCUMENTS

| | | | | |
|---|---|---|---|---|
| 7,124,027 | B1* | 10/2006 | Ernst, Jr. ............... | B60W 30/09 701/301 |
| 7,289,019 | B1* | 10/2007 | Kertes ................... | B60Q 9/008 340/435 |
| 7,292,152 | B2* | 11/2007 | Torkkola ............... | G08B 21/06 340/426.2 |
| 2007/0021915 | A1* | 1/2007 | Breed ................... | B60N 2/2863 701/301 |
| 2007/0109111 | A1* | 5/2007 | Breed ................... | B60N 2/2863 340/435 |
| 2007/0152804 | A1* | 7/2007 | Breed ................... | B60N 2/2863 340/435 |
| 2013/0325244 | A1* | 12/2013 | Wang ..................... | G05D 1/028 701/26 |
| 2015/0035685 | A1* | 2/2015 | Strickland ............. | B60Q 9/008 340/901 |
| 2015/0091740 | A1* | 4/2015 | Bai ........................ | G08B 21/06 340/901 |
| 2016/0117853 | A1* | 4/2016 | Zhong ................... | B64C 39/024 345/634 |
| 2016/0231746 | A1* | 8/2016 | Hazelton ............... | G05D 1/0257 |

* cited by examiner

LONG TERM DRIVING DANGER PREDICTION SYSTEM

This application claims priority to Provisional Application 62/146,565, filed Apr. 13, 2015, and this application is a divisional of application Ser. No. 15/088,494, filed Apr. 1, 2016, the content of which is incorporated by reference.

BACKGROUND

The present invention relates to systems and methods for long term automotive danger prediction.

In this age of increasing driving distractions, drivers are ever more likely to fail to recognize potential danger in complex driving situations. Collision avoidance systems are becoming common in cars. These systems apply the brakes when the driver fails to notice obstacles at close range. These systems operate in a short time range and are mostly reactive. However, these systems do not predict danger on a longer time horizon, nor focus on the driver's attentiveness.

SUMMARY

In one aspect, systems and methods are disclosed to assist a driver with a dangerous condition by combining several sensor modalities available on modern cars to detect traffic participants as well as static elements; creating a graph representation where traffic participants and static elements are the vertices and the edges are relations between pairs of vertices; adding attributes to the vertices and edges of the graph based on information obtained on the driving vehicle, the traffic participants and additional information; creating a codebook of traffic situations known to be precursors to dangerous situations, each represented as graphs; performing subgraph matching between the graphs in the codebook and the graph representing a current driving situation to select a set of matching graphs from the codebook; determining a distance function between each selected codebook graphs and the matching subgraph of the current driving situation; from codebook graphs with a low distance, determining potential future dangers; and generating alerts to the driver appropriately.

Advantages of the system may include one or more of the following. The system helps drivers who are ever more likely to fail to recognize potential danger in complex driving situations. The system provides long range (several seconds) advance warning for dangerous driving situations. In contrast, existing system are collision warning that simply react to the presence of an obstacle directly ahead of the vehicle by applying the brakes. Long range warnings about impending dangerous driving situations could lead to a reduction in accidents. Collision warning systems provide an added security, however they can only be engaged at the last moment, when it is often too late. By identifying a dangerous situation ahead of time, the system has time to warn the driver or slow down the vehicle over a longer period of time, avoiding sudden evasive maneuvers which are inherently dangerous. The system can improve the safety of driving a car by predicting the occurrence of dangerous driving situations up to several seconds ahead of time. The system provides an added level of safety for driving cars and can also be used in autonomous cars.

DESCRIPTION

Figure 1:
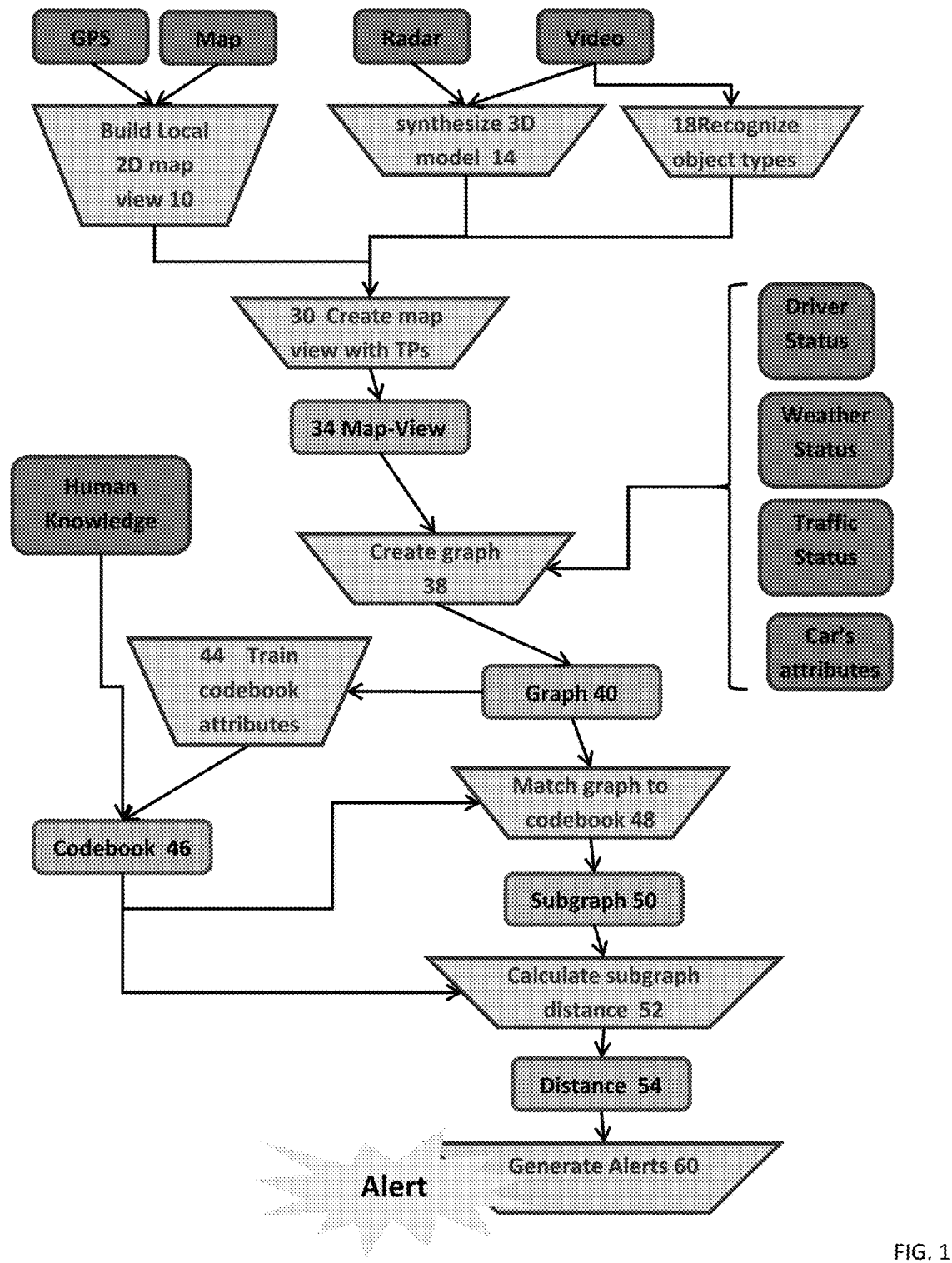
FIG. 1 shows an exemplary system architecture for danger prediction.

Referring now to the drawings in which like numerals represent the same or similar elements and initially to FIG. 1, an exemplary process for assisting driver is presented.

The process captures input from hardware such as radar, video, GPS, street map, driver-status, traffic and weather information and combines it to represent a driving situation in a top-view 2D representation containing a graph of static elements (road, signs, etc.) and traffic participants. The GPS unit of the car is used to position the driving vehicle on a street map that contains information about roads, intersection, etc. The radar module detects and tracks the position and velocities of a number of objects relative to the driving car. These objects (position and velocities) are then placed on a top view two-dimensional representation. Video information may be used to improve the accuracy of the positioning by using lane detection or structure from motion. In addition, the video may be used to recognize the type of objects (car, pedestrian, static obstacle) found by the radar. Furthermore it may also be used to recognize traffic signage.

The top-view 2D representation is then converted into a combined graph representation where vertices are the traffic participant (TP) as well as the static elements (SE) and the edges represent the relations between pairs of TP/SEs. Vertices and edges contain attributes describing their nature and characteristics. Vertices attributes may contain the type of object it represents (e.g. car, truck, pedestrian, etc.), intrinsic parameters (e.g. physical characteristics of cars, width of road lanes, mental status of driver, etc.), and also global information (e.g. weather, traffic, etc.). Edges attributes typically contain relations such as action types (e.g. 'driving on', 'approaching', etc.), relative position, speed and acceleration. Attributes can be either actual values or ranges of values. Such top-view 2D graph representations are compact and well suited for comparison and queries.

Next, potential dangerous driving situations are analyzed. Such situations may originally be described in police reports, driver's permit booklets, in naturalistic driving datasets (e.g. SHRP2) or also from common sense driving knowledge. Transcribing this knowledge into a codebook of dangerous driving situation is a one-time manual step.

Let's follow an example to illustrate the process. Starting with the following common sense description: "When driving on the passing lane on a highway, you must watch out for cars cutting you off while attempting to pass, in particular you can anticipate this by watching for cars going faster than the car in front of them". The following graph encodes the situation:

Static elements (vertices):
SE1: highway lane #1
SE2: highway lane #2 (passing lane)
Traffic Participants (vertices):
DC: driving car
TP1: car ahead on lane
TP2: car ahead of TP1
Relations (edges):
DC-SE2: driving on lane
TP1-SE1: driving on lane
TP2-SE1: driving on lane
DC-TP1: relative position: ahead, less than 100 m, to the right 2 to 3 m; relative speed: forward negative TP1-TP2: relative position: ahead, less than 100 m; relative speed forward negative The process of matching the encoded situation to the current driving situation is performed using subgraph matching techniques. Once possible candidate situation have been identified, a distance function is used to evaluate how close the current situation is to the candidate codebook situations. Thresholds are defined so that alerts can be triggered when the current driving situation is deemed close to one or more of the codebook situations.

Figure 3:
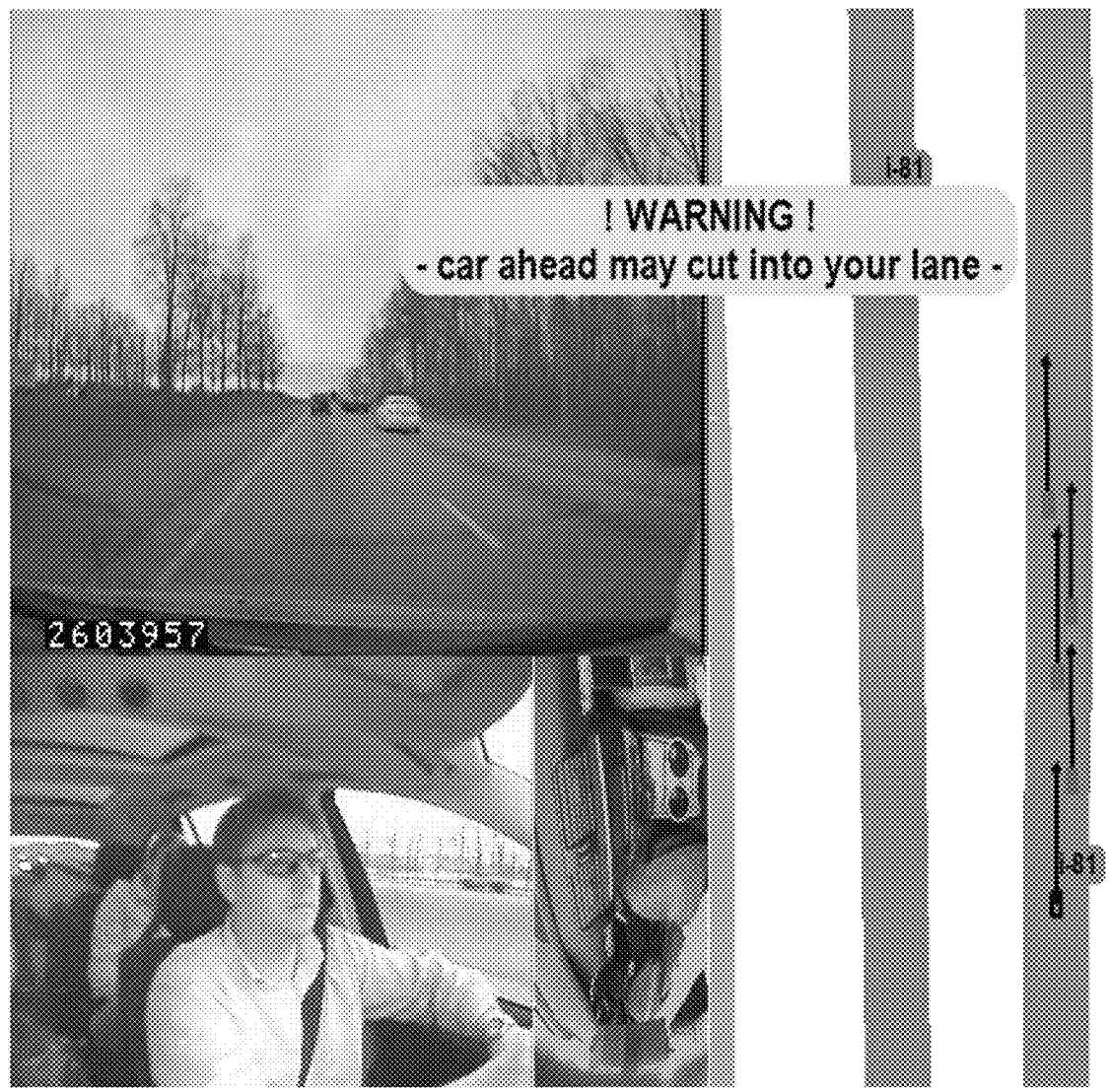
FIG. 3 shows an exemplary operation of the system.

Coming back to the example, the current driving situation of FIG. 3 is encoded into a graph. There is not an exact match with the codebook situation described above; however subgraph matching successfully identifies a subgraph of the current driving situation that is an exact match. The next step is to measure how close a match the two situations are based on the attributes of the graph vertices and edges. In this case the positions and velocities of the TPs are close, so the distance calculation returns a small value and because it is below threshold, a warning is activated.

The distance function is calculated using the attributes of two subgraphs which structures have been matched. We are contemplating various implementation of this distance function. In one embodiment, the attributes of subgraphs can be compared using a trained classifier that has learned to output a distance value based on supervised machine learning. Such classifiers could be trained independently for each codebook entry, or globally, based on attributes statistics (such that the input feature vectors to a classifier have matching length). Supervised learning techniques such as SSI are well suited to train such classifiers with alternating pairs of positive and negative examples. In another embodiment, the distance function between a pair of subgraphs is defined manually based on certain attributes, so that each codebook situation comes with its own distance function. In a third embodiment, a generic distance function is defined that checks each attribute against a range of acceptable values encoded in the codebook situations. These ranges may have been obtained either manually by direct observation or through unsupervised learning techniques, such as clustering using recorded driving datasets.

Turning now to FIG. 1, GPS and map data is used to build a local 2D map view 10. Radar and video data is used to synthesize a 3D model 14, while video data is used to recognize object types 18. From the foregoing, the process creates a map view 34 with TPs 30. A graph is created in 38. The graph receives data such as driver status, weather status, traffic status, and car attributes and updates the graph in 40. The data is used to train codebook attributes in 44. Together with human knowledge, a codebook is formed in 46. The graph is matched to the codebook in 48, and subgraphs are generated in 50. The process determines subgraph distance in 52, and inter-vehicle distances are determined in 54. If too close, an alarm is generated in 60.

Figure 2:
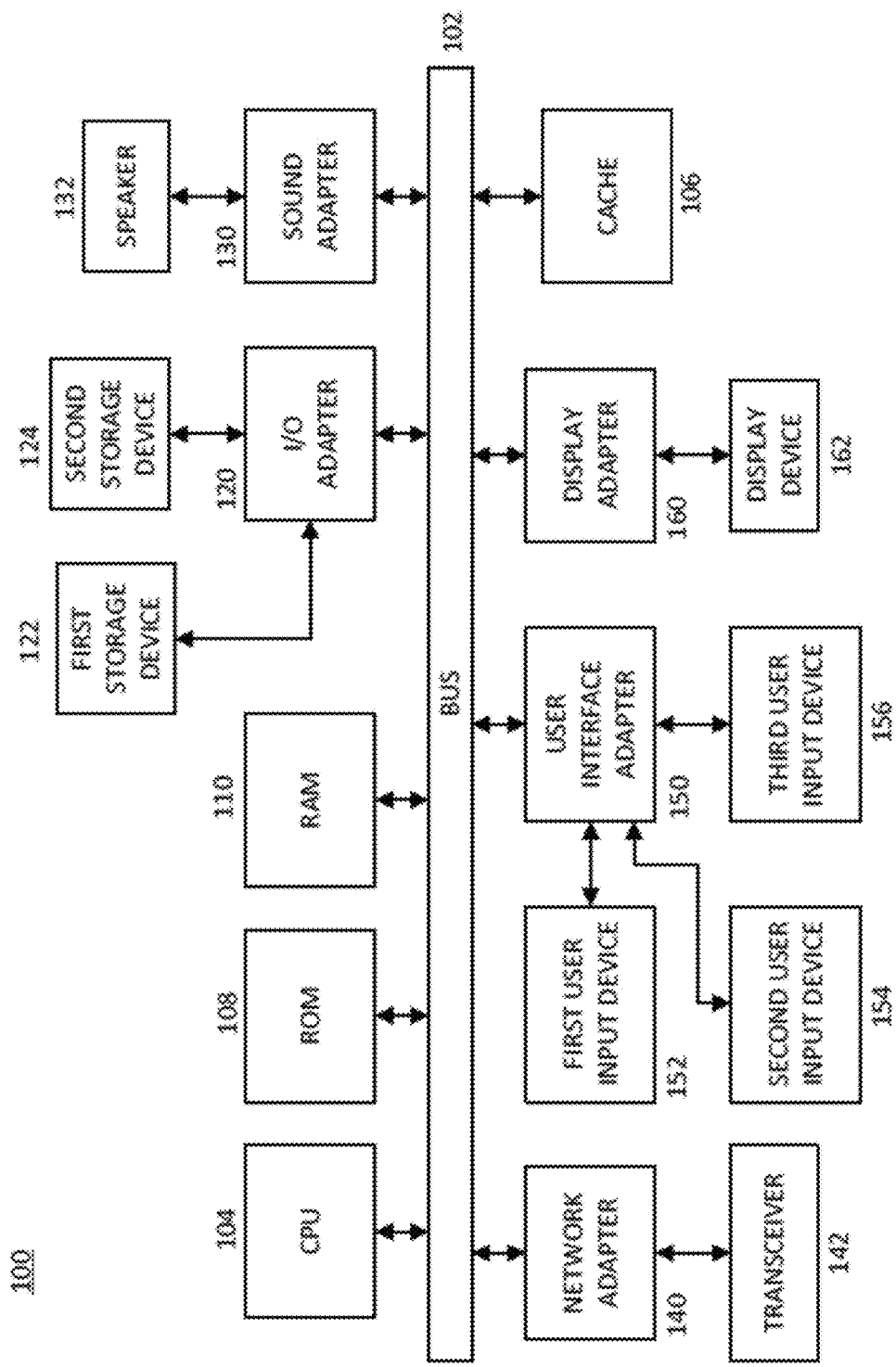
FIG. 2 shows an exemplary automotive computing system.

Referring now to FIG. 2, an exemplary car processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Further, it is to be appreciated that processing system 100 may perform at least part of the methods described herein including, for example, at least part of method of FIG. 1.

FIG. 3 shows an exemplary operation of the system. In this hypothetical, a white car ahead is about to pass the truck and cut into the driving car's lane. On the right is the map representation of the traffic as obtained using radar, GPS and map. As an illustration of an action taken by the system, the yellow warning pops up before the white car starts changing lane.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A guidance system for a vehicle, comprising:
a processor executing a code for:
   receiving an input from sensors, the input indicating surrounding traffic participants and information regarding a driving situation;
   receiving a local map locating the vehicle;
   creating a graph representation where traffic participants and static elements are the vertices and the edges are relations between pairs of vertices;
   adding attributes to the vertices and edges of the graph based on information obtained on the driving vehicle, the traffic participants and additional information;
   creating or obtaining a codebook of dangerous driving situations, each represented as graphs;
   performing subgraph matching between the graphs in the codebook and the graph representing a current driving situation to select a set of matching graphs from the codebook;
   calculating a distance between each selected codebook graph and the matching subgraph of the current driving situation;
   determining potential dangers from codebook graphs with a low distance; and
   generating an alert if one or more of the codebook dangers are imminent.

2. The system of claim 1, comprising predicting a dangerous driving situation a few seconds before occurrence.

3. The system of claim 1, comprising an input modality obtained from radar.

4. The system of claim 1, comprising an input modality obtained from a video camera with a structure from motion 3D generator.

5. The system of claim 1, comprising recognizing object types using computer vision on a video image as an input modality.

6. The system of claim 1, comprising using GPS coordinates from a vehicle sensor combined with a GPS-enabled local map.

7. The system of claim 1, comprising receiving as an input modality one or more of:
   a driver status including sleepiness, aggressiveness and impairment;
   a weather status including road surface, temperature, daylight, rain, snow;
   a traffic situation proximal to the vehicle including roadwork, delays, accident; and
   vehicle physical characteristics including length, width, weight, braking capabilities.

8. The system of claim 1, wherein the codebook is populated by known dangerous driving situations.

9. The system of claim 1, wherein the codebook is refined by using a database of recorded driving and unsupervised learning techniques to discover attribute ranges of traffic participant relations.

10. The system of claim 1, wherein a distance function is defined between subgraphs, wherein said distance function between subgraphs is learned by supervised machine learning using subgraph attributes as features.

11. The system of claim 10, wherein one classifier per each codebook graph is trained using labeled data to predict a distance between two matching subgraphs.

12. The system of claim 1, wherein a distance function is defined between subgraphs, wherein said distance function between subgraphs is learned using supervised machine learning using statistics of the attributes and a single classifier is trained for the codebook.

13. The system of claim 1, wherein a distance function is defined between subgraphs, wherein said distance function is crafted for each codebook graph based on a particular set of attributes.

14. The system of claim 1, where a distance function is defined between subgraphs, wherein said distance function is a generic distance based on measured ranges of attributes.

15. The system of claim 1, comprising sounding an audible alert, a 3D-localized audible alert to attract a driver's attention to a location of a potential danger, or a voice alert telling the driver about a danger.

16. The system of claim 1, comprising displaying one or more of: a warning message on the dashboard, a warning message on the windshield, a warning hologram.

17. The system of claim 1, comprising illuminating or projecting a highlight on the windshield, side windows or car interior to locate traffic participants involved in a dangerous situation.

18. The system of claim 1, vibrating the steering wheel, brakes, accelerator or seat to warn of danger.

19. The system of claim 1, comprising acting on the brakes or an ability of a driver to accelerate.

20. A method executed on a vehicle guidance system with sensors to capture surrounding traffic participants and information regarding a driving situation to assist a driver with a dangerous condition, comprising:
   creating a graph representation where traffic participants and static elements are the vertices and the edges are relations between pairs of vertices;
   adding attributes to the vertices and edges of the graph based on information obtained on the driving vehicle, the traffic participants and additional information;
   creating or obtaining a codebook of dangerous driving situations, each represented as graphs;

performing subgraph matching between the graphs in the codebook and the graph representing a current driving situation to select a set of matching graphs from the codebook;

calculating a distance between each selected codebook graph and the matching subgraph of the current driving situation;

determining potential dangers from codebook graphs with a low distance; and;

generating an alert if one or more of the codebook dangers are imminent.

\* \* \* \* \*